(12) United States Patent
Borghetti et al.

(10) Patent No.: US 11,051,384 B1
(45) Date of Patent: Jun. 29, 2021

(54) CIRCUITS WITH SHORT CIRCUIT PROTECTION FOR LIGHT EMITTING DIODES

(71) Applicant: Infineon Technologies AG, Neubiberg (DE)

(72) Inventors: Fausto Borghetti, Sant'Ambrogiodi Valpolicella (IT); Hector Moreno, El Paso, TX (US)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/999,169

(22) Filed: Aug. 21, 2020

(51) Int. Cl.
*H05B 45/54* (2020.01)
*H05B 45/44* (2020.01)

(52) U.S. Cl.
CPC .............. *H05B 45/54* (2020.01); *H05B 45/44* (2020.01)

(58) Field of Classification Search
CPC ................................ H05B 45/54; H05B 45/44
See application file for complete search history.

(56) References Cited

U.S. PATENT DOCUMENTS

| | | | |
|---|---|---|---|
| 8,558,481 B2* | 10/2013 | Kim ....................... | H05B 45/44 315/297 |
| 2013/0200812 A1* | 8/2013 | Radermacher ......... | H05B 45/44 315/186 |
| 2019/0005878 A1* | 1/2019 | Yue ........................ | G09G 3/006 |

* cited by examiner

*Primary Examiner* — Daniel D Chang
(74) *Attorney, Agent, or Firm* — Shumaker & Sieffert, P.A.

(57) ABSTRACT

This disclosure is directed to circuits for controlling voltage from a voltage source to one or more light emitting diodes. The circuit includes a first transistor comprising a power switch that is configured to define a load current path from the voltage source to the one or more light emitting diodes. The circuit also includes a second transistor, which can be controlled based on the light emitting diodes, wherein the second transistor is configured to turn off when one or more of the lights emitting diodes exhibit an electoral short. The first transistor is configured to turn off in response to the second transistor turning off so as to provide short circuit protection for the circuit.

17 Claims, 7 Drawing Sheets

CIRCUITS WITH SHORT CIRCUIT PROTECTION FOR LIGHT EMITTING DIODES

TECHNICAL FIELD

This disclosure relates circuits for controlling current through light emitting diodes.

BACKGROUND

Drivers are often used to control a voltage, current, or power at a load. For instance, a light emitting diode (LED) driver may control the power supplied to a string of light emitting diodes. Some drivers may include a DC to DC power converter, such as a buck-boost, buck, boost, or another DC to DC converter. Such DC to DC power converters may be used to control and possibly change the power at the load based on a characteristic of the load. DC to DC power converters may be especially useful for controlling current supplied to one or more LED strings.

It is often desirable to control or limit current to LED strings. To do so, a resistor may be positioned between a DC to DC power converter and a LED string to limit current supplied to the LED string.

SUMMARY

In general, this disclosure describes circuits for controlling voltage from a voltage source to one or more light emitting diodes in order to provide short circuit protection in the event of a short circuit in the one or more light emitting diodes. The circuit may include a first transistor comprising a power switch that is configured to define a load current path from the voltage source to the one or more light emitting diodes. The circuit may also include a second transistor, which can be controlled based on the light emitting diodes, wherein the second transistor is configured to turn off when one or more of the lights emitting diodes exhibit an electoral short. The first transistor may be configured to turn off in response to the second transistor turning off so as to provide short circuit protection for the circuit.

In one example, this disclosure describes a circuit configured to control voltage from a voltage source to one or more light emitting diodes. The circuit comprises a first electrical pin configured to be electrically connected to the voltage source, a second electrical pin configured to be electrically connected to the one or more light emitting diodes, a first transistor electrically coupled to the first electrical pin and the second electrical pin, wherein the first transistor comprises a power switch configured to define a load current path from the voltage source to the one or more light emitting diodes, and a first resistor electrically coupled to the first electrical pin and the second electrical pin and positioned in parallel with the load current path. In addition, the circuit also comprises a second transistor electrically coupled to a control node of the first transistor and a reference node, wherein a control node of the second transistor is electrically coupled to the second electrical pin, and a second resistor positioned between the first electrical pin and the control node of the first transistor. The second transistor is configured to turn off in response to a short circuit event in the one or more light emitting didoes, and the first transistor is configured to turn off in response to the second transistor turning off.

In another example, this disclosure describes a circuit configured to control voltage from a voltage source to a string of light emitting diodes and the circuit may be configured to provide short circuit protection in the event of a short circuit associated with a single light emitting diode within the string of light emitting diodes. The circuit may comprise a first electrical pin configured to be electrically connected to the voltage source, a second electrical pin configured to be electrically connected to the string of light emitting diodes, a first transistor electrically coupled to the first electrical pin and the second electrical pin, wherein the first transistor comprises a power switch configured to define a load current path from the voltage source to the one or more light emitting diodes, and a first resistor electrically coupled to the first electrical pin and the second electrical pin and positioned in parallel with the load current path. In addition, the circuit may further comprise a second transistor electrically coupled to a control node of the first transistor and a reference node, wherein a control node of the second transistor is electrically coupled to second electrical pin, a second resistor positioned between the first electrical pin and the control node of the first transistor, a Zener diode positioned between the control node of the second transistor and the second electrical pin such that a forward conduction path of the diode is defined from the control node of the second transistor to the second electrical pin, and a third resistor positioned between the control node of the second transistor and the reference node. The second transistor is configured to turn off in response to a short circuit event associated with a single light emitting diode within the string of light emitting diodes, and the first transistor is configured to turn off in response to the second transistor turning off.

In another example, this disclosure describes a method that comprises controlling voltage from a voltage source to one or more light emitting diodes via a circuit that includes a first transistor comprising a power switch configured to define a load current path from the voltage source to the one or more light emitting diodes, controlling a control node of a second transistor based on the light emitting diodes, wherein the second transistor is configured to turn off when one or more of the light emitting diodes exhibit an electoral short, and controlling a control node of a first transistor such that the first transistor is configured to turn off in response to the second transistor turning off.

Details of these and other examples are set forth in the accompanying drawings and the description below. Other features, objects, and advantages will be apparent from the description and drawings, and from the claims.

DETAILED DESCRIPTION

This disclosure describes circuits for controlling voltage from a voltage source to one or more light emitting diodes (LEDs) in order to provide short circuit protection in the event of a short circuit in the one or more LEDs. The described circuits may be used in a wide variety of LED applications, and may be especially useful in settings where it is desirable to identify short circuit events, such as for LEDs used in motorized or electric vehicles. The circuits may also be very useful in situations where two or more LEDs (or two or more strings of LEDs) are connected in parallel, where a short in one of the LEDs (or one of the strings) can significantly affect the voltage delivered to the other LED (or other LED string).

In some examples, the circuit includes a first transistor (e.g., a PMOS) comprising a power switch that is configured to define a load current path from the voltage source to the one or more light emitting diodes. The circuit also includes a second transistor (e.g., an NMOS), which can be controlled based on the light emitting diodes, wherein the second transistor is configured to turn off when one or more of the lights emitting diodes exhibit an electoral short. The first transistor is configured to turn off in response to the second transistor turning off so as to provide short circuit protection for the circuit. In other words, the first transistor can disconnect from a load when a short appears at an output of the circuit. The second transistor acts like a sensor, essentially sensing the output voltage of the first transistor and responding to a short circuit event. In some examples, a Zener diode may be added to the circuit to enable the ability to detect and protect against a single LED short within a string of LEDs.

Figure 1:
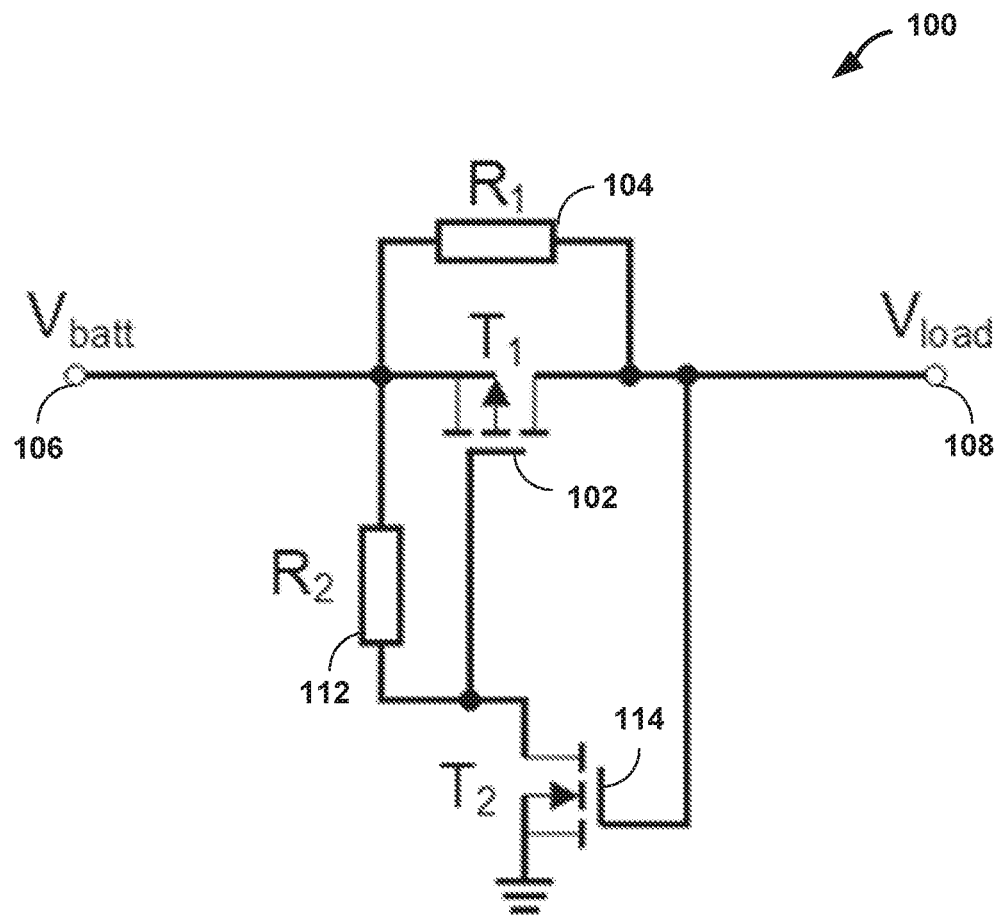
FIG. 1 is a circuit diagram of an example circuit that may be used to control voltage from a voltage source to one or more light emitting diodes (LEDs).

FIG. 1 is a circuit diagram of an example circuit 100 that may be used to control voltage from a voltage source to one or more LEDs. Circuit 100 may be a so-called "high-side" circuit with first transistor 102 comprising a high-side power switch, and circuit 100 may provide high-side short circuit protection.

As shown in FIG. 1, circuit 100 includes a first electrical pin 106 (also referred to as an "input pin") configured to be electrically connected to the voltage source, and a second electrical pin 108 (also referred to as an "output pin") configured to be electrically connected to one or more LEDs. The voltage source, for example, may comprise a DC to DC power converter or another voltage source commonly used to drive LEDs. The term "Vbatt" generally represents the input voltage on the node associated with first electrical pin 106. The term "Vload" generally represents the output voltage on the node associated with second electrical pin 108, which can be electrically coupled to one or more LEDs. The one or more LEDs may be arranged on a separate circuit (e.g., separate from circuit 100), and the separate circuit with the LEDs may include a limiting resistor positioned between the LED's and second electrical pin 108 of circuit 100. In some examples, the LEDs may include two or more LEDs connected in parallel (or two or more strings of LEDs connected in parallel), which may be desirable for lower cost applications where a single driver is used to drive multiple LEDS or multiple sets LEDs.

Circuit 100 includes a first transistor 102 electrically coupled to the first electrical pin 106 and the second electrical pin 108. First transistor 102 is also labeled T1 in FIG. 1. First transistor 102 may comprise a power switch configured to define a load current path from the voltage source coupled to first electrical pin 106 to the one or more light emitting diodes coupled to output pin 108. In some examples, first transistor 102 may comprise a PMOS transistor, which may be a cost-effective power switch design for the load current path. However, in other examples, other types of transistors could also be used for first transistor 102.

Circuit 100 also includes a first resistor 104 electrically coupled to the first electrical pin 106 and the second electrical pin 108 and positioned in parallel with first transistor 102. In other words, first resistor 104 and the load current path through first transistor 102 are parallel electrical paths. First resistor 104 defines a high impedance path from first electrical pin 106 to second electrical pin 108 that is much higher than the load current path through first transistor 102 when first transistor 102 is on. In some examples, resistor 104 defines a resistance between 50 KiloOhms (KOhms) and 100 Kohms, although another sized resistor could be used in other examples.

As shown in FIG. 1, a second transistor 114 is electrically coupled to a control node (e.g., the gate) of first transistor 102 and to a reference node (e.g., a ground node). Second transistor 114 is also labeled T2 in FIG. 1. In some examples, the second transistor 114 may comprise a NMOS transistor, which may be a cost-effective design for circuit 100. However, in other examples, other types of transistors could also be used for second transistor 114.

A control node (e.g., the gate) of second transistor 114 is electrically coupled to the second electrical pin 108. In addition, a second resistor 112 is positioned between the first electrical pin 106 and the control node (e.g., the gate) of first transistor 102. In some examples, second resistor 112 defines a resistance between 10 KOhms and 47 Kohms, although another sized resistor could be used in other examples. Second transistor 114 is configured to turn off in response to a short circuit event in the one or more LEDs connected to the second electrical pin. In this way, second transistor 114 is controlled based on whether or not a short circuit exists on LEDs connected to second electrical pin 108. Second transistor 114 remains on if there is no short circuit in the LEDs connected to second electrical pin 108. If a short circuit event occurs in the one or more LEDs connected to second electrical pin 108, second transistor 114 turns off.

According to this disclosure, first transistor 102 is configured to turn off in response to the second transistor 114 turning off. In this way, the load current path through first transistor 102 can be disabled in response to a short circuit event on the one or more LEDs. The short circuit event on the one or more LEDs causes second transistor 114 to turn off, which in turn, causes first transistor 102 to turn off. In this way, circuit 100 includes short circuit protection against a short circuit event in the one or more LEDs, which may be desirable for some applications. When first transistor 102 turns off, the low impedance path from input pin 106 to output pin 108 is disabled and the only current path from input pin 106 to output pin 108 is a high impedance path through first resistor 104. This can protect circuit 100 and other elements of a larger system from damage or electrical failure in the event of a short circuit in the one or more LEDs.

As mentioned above, in some cases, first transistor 102 may comprise a PMOS transistor and second transistor 114 may comprise an NMOS transistor, which is a cost-effective implementation. More generally, however, first transistor 102 and second transistor 114 could each be implemented as a Field Effect Transistor (FET), a bipolar junction transistor (BJT), a gallium nitride (GaN) switch, or possibly a silicon controlled rectifier (SCR). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same.

In one specific implementation, a circuit 100 according to this disclosure may utilize two MOSFETs (e.g., one PMOS corresponding to first transistor 102 and one NMOS corresponding to second transistor 104) to sense and to react at short circuit events. Input voltage ($V_{batt}$) is applied to the source of the PMOS (e.g., first transistor 102) and to the bias resistor 104, while the load (e.g., one or more LEDs) is connected to the drain of the PMOS and to ground. When an input voltage $V_{batt}$ is applied, resistor 104 biases the gate of NMOS (e.g., second transistor 114) over the threshold, and this implies that the NMOS goes in conduction imposing a $V_{GS}=V_{batt}$ to the PMOS. With this scenario, the PMOS (e.g., first transistor 102) goes in a low Ohmic state. Second resistor 112 may limit the current into NMOS and pull up the gate to ensure that the NMOS is in an OFF state when there is no short in the load. If the load is shorted to ground, the $V_{GS}$ of the NMOS is below the threshold and then the NMOS transitions to an OFF state. If the NMOS (e.g., second transistor 114) is in an OFF state, the PMOS (e.g., first transistor 102) is switched off. In this way, a short to ground in the load, can be detected by sensing the drain of the NMOS.

Figure 2:
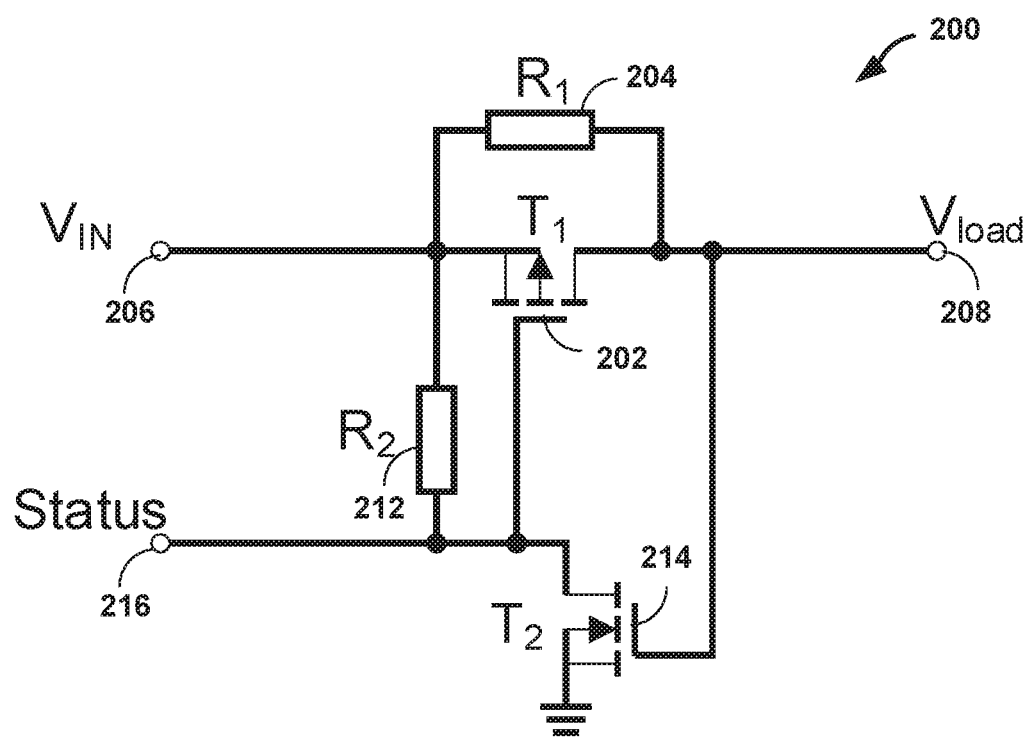
FIG. 2 is a circuit diagram illustrating a circuit similar to that of FIG. 1 and including an additional pin to provide status information of the circuit.

FIG. 2 is a circuit diagram illustrating a circuit similar to that of FIG. 1 and including an additional pin (e.g., status pin 216) to provide status information of the circuit. Like FIG. 1, FIG. 2 is a circuit diagram of an example circuit (e.g., circuit 200) that may be used to control voltage from a voltage source to one or more LEDs. As shown in FIG. 2, circuit 200 includes a first electrical pin 206 (also referred to as an "input pin") configured to be electrically connected to the voltage source, and a second electrical pin 208 (also referred to as an "output pin") configured to be electrically connected to one or more LEDs. As with FIG. 1, in FIG. 2, the term "Vbatt" generally represents the input voltage on the node associated with first electrical pin 206. The term "Vload" generally represents the output voltage on the node associated with second electrical pin 208, which can be electrically coupled to one or more LEDs. The one or more LEDs may be arranged on a separate circuit (e.g., separate from circuit 200), and the separate circuit with the LEDs may include a limiting resistor positioned between the LED's and second electrical pin 208 of circuit 200.

Like circuit 100 of FIG. 1, circuit 200 of FIG. 2 includes a first transistor 202 electrically coupled to the first electrical pin 206 and the second electrical pin 208. First transistor 202 is also labeled T1 in FIG. 2. First transistor 202 may comprise a power switch configured to define a load current path from the voltage source coupled to first electrical pin 206 to the one or more light emitting diodes coupled to output pin 208. In some examples, first transistor 202 may comprise a PMOS transistor, which may be a cost-effective power switch design for the load current path. However, in other examples, other types of transistors could also be used for first transistor 202.

Circuit 200 also includes a first resistor 204 electrically coupled to the first electrical pin 206 and the second electrical pin 208 and positioned in parallel with first transistor 202. In other words, first resistor 204 and the load current path through first transistor 202 are parallel electrical paths. First resistor 204 defines a high impedance path from first electrical pin 206 to second electrical pin 208 that is much higher than the load current path through first transistor 202 when first transistor 202 is on. In some examples, first resistor 204 defines a resistance between 50 KOhms and 100 Kohms, although another sized resistor could be used in other examples.

As shown in FIG. 2, a second transistor 214 is electrically coupled to a control node (e.g., the gate) of first transistor 202 and to a reference node (e.g., a ground node). Second transistor 214 is labeled T2 in FIG. 2 (which is similar labelling to FIG. 1). In some examples, the second transistor 214 may comprise an NMOS transistor, which may be a cost-effective design for circuit 200. However, in other examples, other types of transistors could also be used for second transistor 214.

A control node (e.g., the gate) of second transistor 214 is electrically coupled to the second electrical pin 208. In addition, a second resistor 212 is positioned between the first electrical pin 206 and the control node (e.g., the gate) of first transistor 202. In some examples, second resistor 212 defines a resistance between 10 KOhms and 47 Kohms, although another sized resistor could be used in other examples. Similar to the example of FIG. 1, in FIG. 2, second transistor 214 is configured to turn off in response to a short circuit event in the one or more LEDs connected to second electrical pin 208. In this way, second transistor 214 is controlled based on whether or not a short circuit exists on LEDs connected to second electrical pin 208. Second transistor 214 remains on if there is no short circuit in the LEDs connected to second electrical pin 208. If a short circuit event occurs in the one or more LEDs connected to second electrical pin 208, second transistor 214 turns off.

First transistor 202 is configured to turn off in response to the second transistor 214 turning off. In this way, the load current path through first transistor 202 can be disabled in response to a short circuit event on the one or more LEDs. The short circuit event on the one or more LEDs causes second transistor 214 to turn off, which in turn, causes first transistor 202 to turn off. In this way, circuit 200 includes short circuit protection against a short circuit event in the one or more LEDs, which may be desirable for LED control. When first transistor 202 turns off, the low impedance path from input pin 206 to output pin 208 is disabled and the only current path from input pin 206 to output pin 208 is a high impedance path through first resistor 204. This can protect circuit 200 and other elements of a larger system from damage or electrical failure in the event of a short circuit in the one or more LEDs. As with the example of FIG. 1, with the example of FIG. 2, the LEDs may include two or more LEDs connected in parallel (or two or more strings of LEDs connected in parallel), which may be desirable for lower cost applications where a single driver is used to drive multiple LEDS or multiple sets LEDs.

Unlike the example of FIG. 1, circuit 200 shown in FIG. 2 further includes a status pin 216 electrically coupled to the control node (e.g., the gate) of first transistor 202. The status pin 216 is configured to define a status signal of the circuit for use a control unit. The control unit, for example, may comprise a microprocessor that delivers control signals to a DC to DC converter that defines the voltage source connected to input pin 206. A status signal on status pin 216 may be the same signal that controls first transistor 202. Thus, the signal that causes first transistor 202 turn off can also be used as a status signal on status pin 216 to report the short circuit event to an external control unit connected to status pin 216. The example shown in FIG. 1 may be more desirable than that of FIG. 2 in some low-cost short circuit protection solutions where the number of pins in the circuit is a cost concern, whereas the example shown in FIG. 2 may be more desirable over that of FIG. 1 when it is desirable to report any short circuit events to the external control unit.

In the operation of circuit 200, at start up, if no short-to-ground is present at the output, $R_1$ biases the output. If no short is present, transistor 214 biases transistor 202 in low ohmic state. If a short appears, the gate of second transistor 214 goes to approximately 0 V and this forces first transistor 202 into an OFF state. Some current leakage may occur, but the current leakage is generally limited to $R_1/V_{batt}$, which may be an acceptable amount of current leakage for LED lighting situations such as in motorized or electric vehicle settings.

Figure 3:
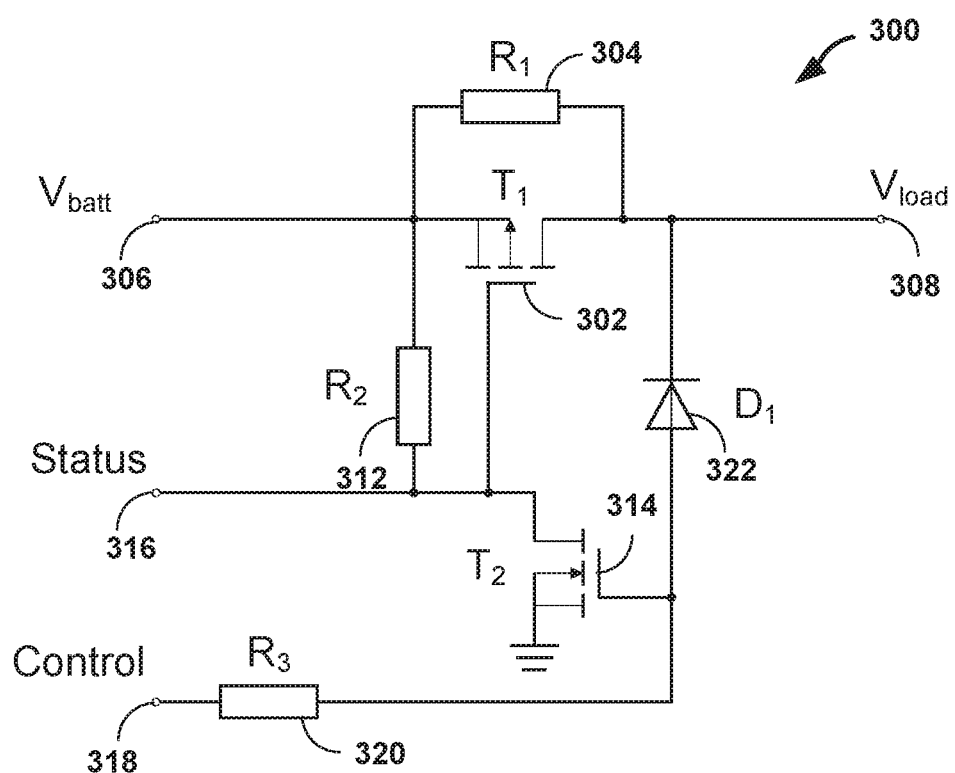
FIG. 3 is a diagram illustrating a circuit similar to that of FIG. 2 and including another additional pin to facilitate additional control of the circuit.

FIG. 3 is a diagram illustrating a circuit similar to that of FIGS. 1 and 2, but further including another additional pin (e.g., control pin 318) to facilitate additional control of the circuit by an external control unit. Like FIGS. 1 and 2, FIG. 3 is a circuit diagram of an example circuit (e.g., circuit 300) that may be used to control voltage from a voltage source to one or more LEDs. As shown in FIG. 3, circuit 300 includes a first electrical pin 306 (also referred to as an "input pin") configured to be electrically connected to the voltage source, and a second electrical pin 308 (also referred to as an "output pin") configured to be electrically connected to one or more LEDs. Similar to FIGS. 1 and 2, the term "Vbatt" generally represents the input voltage on the node associated with first electrical pin 306. The term "Vload" generally represents the output voltage on the node associated with second electrical pin 308, which can be electrically coupled to one or more LEDs. The one or more LEDs may be arranged on a separate circuit (e.g., separate from circuit 300), and the separate circuit with the LEDs may include a limiting resistor positioned between the LED's and second electrical pin 308 of circuit 300.

Like circuits 100 and 200 of FIGS. 1 and 2, circuit 300 of FIG. 3 includes a first transistor 302 electrically coupled to the first electrical pin 306 and the second electrical pin 308. First transistor 302 is also labeled T1 in FIG. 3 (which is similar to the labeling in FIGS. 1 and 2). First transistor 302 may comprise a power switch configured to define a load current path from the voltage source coupled to first electrical pin 306 to the one or more light emitting diodes coupled to output pin 308. In some examples, first transistor 302 may comprise a PMOS transistor, which may be a cost-effective power switch design for the load current path. However, in other examples, other types of transistors could also be used for first transistor 302.

Circuit 300 also includes a first resistor 304 electrically coupled to the first electrical pin 306 and the second electrical pin 308 and positioned in parallel with first transistor 302. In other words, first resistor 304 and the load current path through first transistor 302 are parallel electrical paths. First resistor 304 defines a high impedance path from first electrical pin 306 to second electrical pin 308 that is much higher than the load current path through first transistor 302 when first transistor 302 is on. In some examples, first resistor 304 defines a resistance between 50 KOhms and 100 Kohms, although another sized resistor could be used in other examples.

As shown in FIG. 3, a second transistor 314 is electrically coupled to a control node (e.g., the gate) of first transistor 302 and to a reference node (e.g., a ground node). Second transistor 314 is labeled T2 in FIG. 3 (which is similar labelling to FIGS. 1 and 2). In some examples, the second transistor 314 may comprise a NMOS transistor, which may be a cost-effective design for circuit 300. However, in other examples, other types of transistors could also be used for second transistor 314.

A control node (e.g., the gate) of second transistor 314 is electrically coupled to the second electrical pin 308. However, in the example shown in FIG. 3 second transistor 314 is not directly coupled to the second electrical pin 308, rather a diode 322 is positioned between the control node of second transistor 314 and second electrical pin 308. Diode 322 is positioned such that a forward conduction path of diode 322 is from the control node of second transistor 314 to second electrical pin 308, and the reverse conduction path (i.e., the breakdown path of diode 322) is the path form second electrical pin 308 to the control node of second transistor 314

In FIG. 3, a second resistor 312 is positioned between the first electrical pin 306 and the control node (e.g., the gate) of first transistor 302. In some examples, second resistor 312 defines a resistance between 10 KOhms and 47 Kohms, although another sized resistor could be used in other examples. Similar to the examples of FIG. 1 and FIG. 2, in FIG. 3, second transistor 314 is configured to turn off in response to a short circuit event in the one or more LEDs connected to second electrical pin 308. In this way, second transistor 314 is controlled based on whether or not a short circuit exists on LEDs connected to second electrical pin 308. Second transistor 314 remains on if there is no short circuit in the LEDs connected to second electrical pin 308. If a short circuit event occurs in the one or more LEDs connected to second electrical pin 308, second transistor 314 turns off.

First transistor 302 is configured to turn off in response to the second transistor 314 turning off. In this way, the load current path through first transistor 302 can be disabled in response to a short circuit event on the one or more LEDs. The short circuit event on the one or more LEDs causes second transistor 314 to turn off, which in turn, causes first transistor 302 to turn off. In this way, circuit 300 includes short circuit protection against a short circuit event in the one or more LEDs, which may be desirable for LED control. When first transistor 302 turns off, the low impedance path from input pin 306 to output pin 308 is disabled and the only current path from input pin 306 to output pin 308 is a high impedance path through first resistor 304. This can protect circuit 300 and other elements of a larger system from damage or electrical failure in the event of a short circuit in the one or more LEDs. As with the examples of FIGS. 1 and 2, with the example of FIG. 3, the LEDs may include two or more LEDs connected in parallel (or two or more strings of LEDs connected in parallel), which may be desirable for lower cost applications where a single driver is used to drive multiple LEDS or multiple sets LEDs.

Similar to the example shown in FIG. 2, circuit 300 shown in FIG. 3 further includes a status pin 316 electrically coupled to the control node (e.g., the gate) of first transistor 302. The status pin 316 is configured to define a status signal of the circuit for use a control unit. The control unit, for example, may comprise a microprocessor that delivers control signals to a DC to DC converter that defines the voltage source connected to input pin 306. A status signal on status pin 316 may be the same signal that controls first transistor 302. Thus, the signal that causes first transistor 302 turn off can also be used as a status signal on status pin 316 to report the short circuit event to an external control unit connected to status pin 316. Again, in some low-cost solutions, it may be desirable to reduce the number of pins and avoid a status pin (such as with the Example of FIG. 1) whereas the examples shown in FIG. 2 or FIG. 3 may be more desirable when it is desirable to report any short circuit events to the external control unit.

Circuit 300 shown in FIG. 3 also includes a control pin 318. A third resistor 320 may be positioned between control pin 318 and the control node (e.g., the gate) of second transistor 314. Control pin 318 is an optional feature relative to the examples shown in FIGS. 1 and 2 and may be desirable for some scenarios where external control is desirable. In particular, control pin 318 may allow an external control unit to provide on-off control of circuit 300. Circuit 300 may have short circuit protection against a short in one or more LEDs connected to output pin 308, but an external controller may also be able to independently control the gate of second transistor 314. Thus, regardless of the presence of any short in the LEDs connected to output pin 308, an external controller connected to control pin 318 may be capable of turning off second transistor 314 via control signals. In this case, turning off second transistor 314 will result in first transistor 302 turning off. In this way, an external control unit may be capable of enabling or disabling the load current path of circuit 300 through first transistor 302.

In some examples, in addition to the features of circuit 100 shown in FIG. 1, circuit 300 of FIG. 3 includes a diode positioned between the control node of second transistor 314 and the second electrical pin 308 such that a forward conduction path of diode 322 is defined from the control node of second transistor 314 to second electrical pin 308. Control pin 318 is configured to provide control signals from a control circuit (e.g., an external control unit) to the control node of second transistor 314. A third resistor 320 is positioned between control pin 320 and the control node of second transistor 314, wherein second transistor is further configured to turn off in response to the control signals from the control circuit (e.g., as an alternative, and in addition to turning off in response to a short circuit event in the one or more LEDs attached to output node 308). Such additional control may be desirable for LED control, although the extra pin for control pin 318 may be undesirable for other situations where the examples of FIG. 1 or 2 may be desirable to reduce costs relative to the example of FIG. 3.

In some examples, in addition to the features of circuit 100 shown in FIG. 1, circuit 300 of FIG. 3 includes a third electrical pin (e.g., status pin 316) electrically coupled to the control node of first transistor 302, wherein the third electrical pin is configured to define a status signal of the circuit for use by a control unit. In this example, a diode 322 is positioned between the control node of second transistor 314 and the second electrical pin (e.g., output pin 308) such that a forward conduction path of diode 322 is defined from the control node of second transistor 314 to the second electrical pin. A fourth electrical pin (e.g., control pin 318) is configured to provide control signals from the control circuit to the control node of second transistor 314, and a third resistor 320 is positioned between the fourth electrical pin and the control node of second transistor 314. In this example, second transistor 314 is further configured to turn off in response to the control signals from the control circuit.

In operation of circuit 300, with the example shown in FIG. 3, at start up, if no short to ground is present, first resistor 304 biases the output. If no short is present and a control signal is applied to control terminal 318 by an external control unit, second transistor 314 biases first transistor 302 to put the load current path of circuit 300 into a low ohmic state. If a short appears at output terminal 308, the gate of second transistor 314 goes to approximately 0 V and this forces first transistor 302 into an OFF state causing a higher ohmic path for current through first resistor 304 of circuit 300. Some current leakage may occur, but the current leakage is generally limited to $R_1/V_{batt}$, which may be an acceptable amount of current leakage for LED lighting situations such as in motorized or electric vehicle settings.

Figure 4:
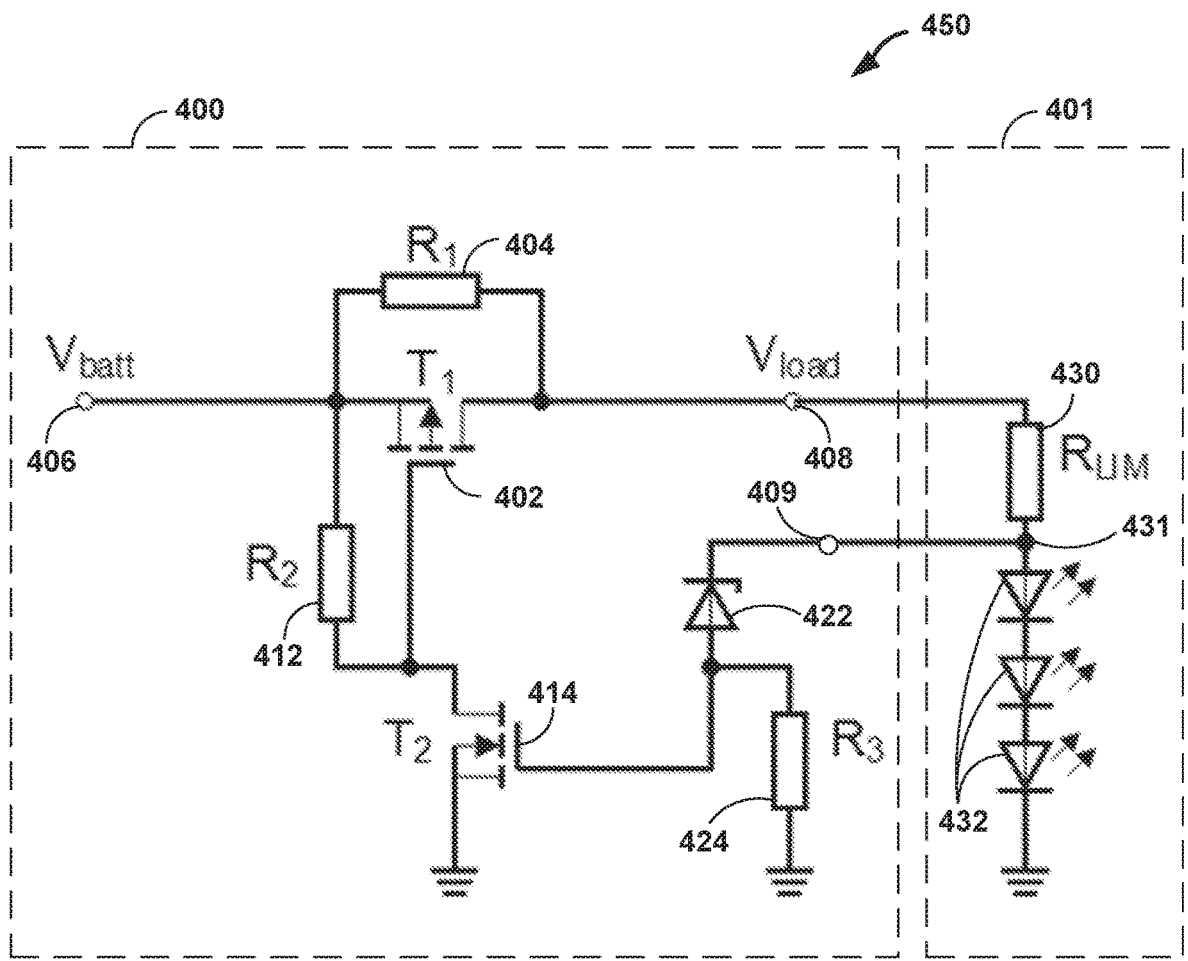
FIG. 4 is an example circuit diagram of an arrangement that includes another example circuit that may be used to control voltage from a voltage source to a string of LEDs.
Figure 5:
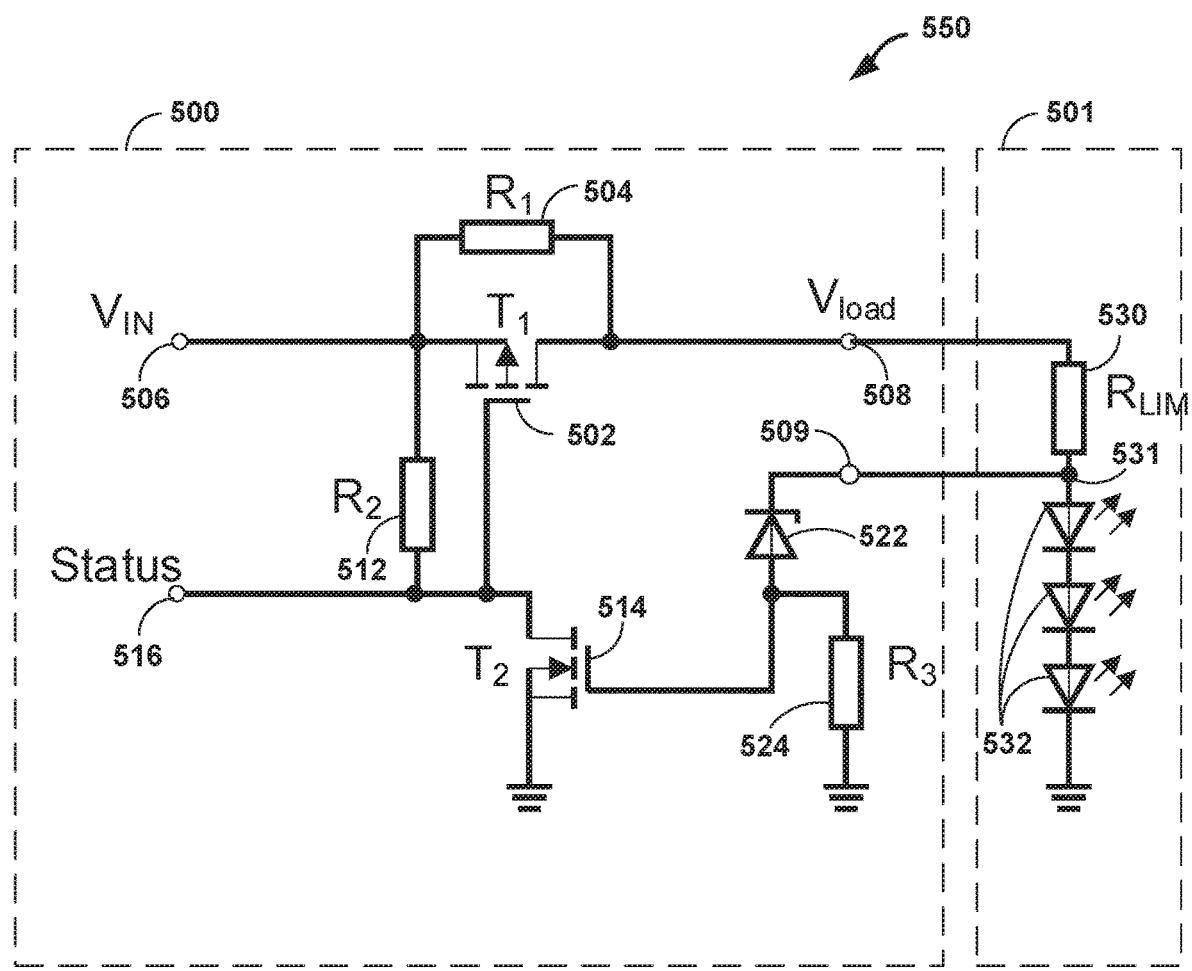
FIG. 5 is a circuit diagram illustrating an arrangement similar to that of FIG. 4 and including a circuit with an additional pin to provide status information of the circuit.
Figure 6:
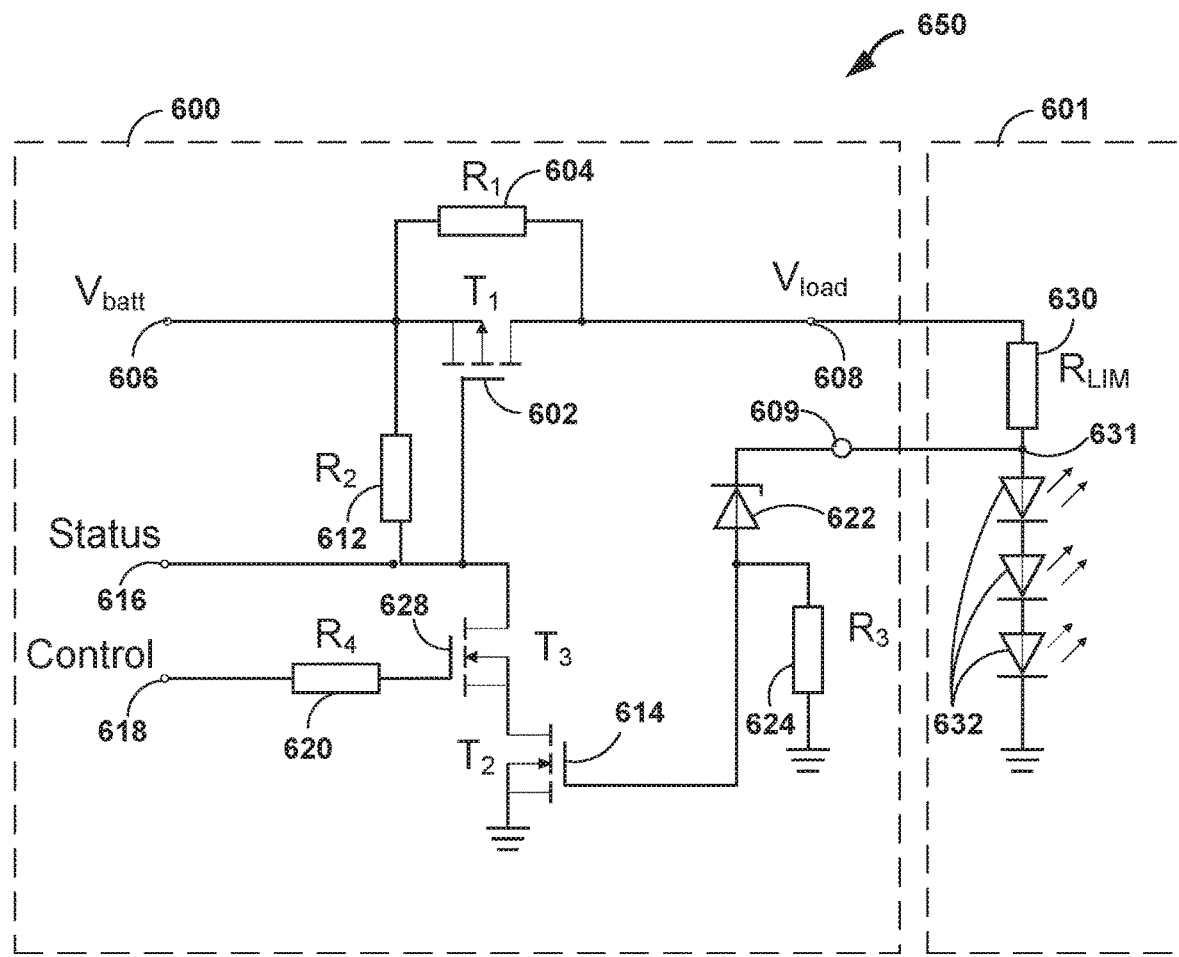
FIG. 6 is a diagram illustrating an arrangement similar to that of FIG. 5 with a circuit that includes yet another additional pin and some additional electrical elements to facilitate additional control of the circuit.

FIGS. 4-6 are additional circuit diagrams of circuits that may be used to control voltage from a voltage source to a string of LEDs. Whereas the examples of FIGS. 1-3 may be configured to provide short circuit protection against an LED short associated with one or more LEDs, FIGS. 4-6 may be designed to provide more refined short circuit protection against an individual LED short within a larger string of LEDs.

FIG. 4 is a circuit diagram of a circuit arrangement 450 that includes a circuit 400 configured to be connected to an LED module 401. Circuit 400 may be a so-called "highside" circuit with first transistor 402 comprising a high-side power switch, and circuit 400 may provide high-side short circuit protection against a single LED short of a plurality of LEDs.

As shown in FIG. 4, LED module 401 may comprise a plurality of LEDs that form a string of LEDs 432 arranged in series. In addition, LED module 401 may comprise a limiting resistor 430 positioned between its input and the string of LEDs 432. Circuit 400 may be configured to control voltage from a voltage source to the string of LEDs 432 in LED module 401 while providing short circuit protection against a single LED short associated with a single LED within the string of LEDs 432.

Circuit 400 includes a first electrical pin 406 (also referred to as an "input pin") configured to be electrically connected to the voltage source, and a second electrical pin 408 (also referred to as an "output pin") configured to be electrically connected to a string of LEDs 432 within LED module 401. In this configuration, second electrical pin 408 may comprise a first output pin and a second output pin 409 may also be used to electrically couple LED module 401 to circuit 400 with the two output pins 408 and 409 being connected on opposite sides of limiting resistor 430. As with other examples described herein, the voltage source may comprise a DC to DC power converter or another voltage source commonly used to drive LEDs. The term "Vbatt" generally represents the input voltage on the node associated with first electrical pin 406. The term "Vload" generally represents the output voltage on the node associated with second electrical pin 408, which can be electrically coupled to the string of LEDs 432 within LED module 401. Again, a limiting resistor 430 may be positioned on LED module 401 between the LED's and second electrical pin 408 of circuit 400.

Circuit 400 includes a first transistor 402 electrically coupled to the first electrical pin 406 and the second electrical pin 408. First transistor 402 is also labeled T1 in FIG. 4. First transistor 402 may comprise a power switch configured to define a load current path from the voltage source coupled to first electrical pin 406 to the string of LEDs 432 within LED module 401 coupled to output pin 408. In some examples, first transistor 402 may comprise a PMOS transistor, which may be a cost-effective power switch design for the load current path. However, in other examples, other types of transistors could also be used for first transistor 402.

Circuit 400 also includes a first resistor 404 electrically coupled to the first electrical pin 406 and the second electrical pin 408 and positioned in parallel with first transistor 402. In other words, first resistor 404 and the load current path through first transistor 402 are parallel electrical paths. First resistor 404 defines a high impedance path from first electrical pin 406 to second electrical pin 408 that is much higher than the load current path through first transistor 402 when first transistor 402 is on. In some examples, first resistor 404 defines a resistance between 50 KOhms and 100 Kohms, although another sized resistor could be used in other examples.

As shown in FIG. 4, a second transistor 414 is electrically coupled to a control node (e.g., the gate) of first transistor 402 and to a reference node (e.g., a ground node). Second transistor 414 is also labeled T2 in FIG. 4. In some examples, the second transistor 414 may comprise a NMOS transistor, which may be a cost-effective design for circuit 400. However, in other examples, other types of transistors could also be used for second transistor 414.

In circuit 400, a second resistor 412 is positioned between the first electrical pin and the control node of first transistor 402. Second resistor 412 may define a resistance between 10 KOhms and 47 Kohms, although another sized resistor could be used in other examples. A Zener diode 422 is positioned between the control node (e.g., the gate) of second transistor 414 and second output pin 409 such that a forward conduction path of the Zener diode 422 is defined from the control node of second transistor 414 to the string of LEDs 431 in LED module 401. In addition, a third resistor 424 is positioned between the control node of second transistor 414 and a reference node (e.g., a ground node). Third resistor 424 may define a resistance between 1 KOhms and 10 Kohms, although another sized resistor could be used in other examples.

Second transistor 414 is configured to turn off in response to a short circuit event associated with a single light emitting diode within the string of light emitting diodes 432. The short circuit event may cause the voltage at node 431 to rise causing current flow in the reverse direction through Zener diode 422 and changing the control signal at the control node of second transistor 414. In this way, second transistor 414 is controlled based on whether or not a short circuit exists on an LED within the string of LEDs 432. Second transistor 414 remains on if there is no short circuit in any of the LEDs within LED module 401, which is connected to circuit 400 via second electrical pin 408 (i.e., a first output pin) and second output pin 409. If a short circuit event occurs in the one of the LEDs within LED string 432, second transistor 414 turns off as a result of a voltage rise at node 431.

According to this disclosure, first transistor 402 is configured to turn off in response to the second transistor 414 turning off. In this way, the load current path through first transistor 402 can be disabled in response to a single short circuit event associated with a single LED within LED string 432. The short circuit event on one of the LEDs causes second transistor 414 to turn off, which in turn, causes first transistor 402 to turn off. In this way, circuit 400 includes short circuit protection against a short circuit event within a single LED of a plurality of LEDs that form LED string 432, which may be desirable for LED control. When first transistor 402 turns off, the low impedance path from input pin 406 to output pin 408 is disabled and the only current path from input pin 406 to output pin 408 is a high impedance path through first resistor 404. This can protect circuit 400 and other elements of a larger system from damage or electrical failure in the event of a short circuit in the one or more LEDs.

With the example shown in FIG. 4, a Zener diode 422 is positioned between the positive terminal of LED string 432 and the gate of second transistor 414 to enable the detection of a single LED short within LED string 432. In this case, the threshold of second transistor 414 is reached and overpassed if the voltage at load side is higher than the threshold voltage on second transistor 414 plus the Zener voltage of Zener diode 422. In the example depicted in FIG. 4, if LED string 432 has no shorts to ground, $V_{LED\_string}$ may be 3 times $V_{LED}$. This voltage may need to be high enough to trigger on second transistor 414 to be in an ON state. If one of the LEDs within LED string 432 exhibit an electrical short, the $V_{LED\_string}$ becomes 2 times $V_{LED}$ and may not be enough voltage to keep second transistor 414 in the ON state. When second transistor 414 turns off as a result of this single LED short, then first transistor 402 also turns to an OFF state. In this way, a single LED short can be detected by sensing the voltage at the gate of second transistor 414.

As with other examples described herein, in some cases, first transistor 402 may comprise a PMOS transistor and second transistor 414 may comprise an NMOS transistor, which is a cost-effective implementation. More generally, however, first transistor 402 and second transistor 414 could each be implemented as a Field Effect Transistor (FET), a bipolar junction transistor (BJT), a gallium nitride (GaN) switch, or possibly a silicon controlled rectifier (SCR). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, a p-type metal oxide semiconductor (PMOS), an n-type metal oxide semiconductor (NMOS), a double diffused metal oxide semiconductor (DMOS), or any other type of MOSFET, or any combination of the same. Examples of BJTs may include, but are not limited to, PNP, NPN, heterojunction, or any other type of BJT, or any combination of the same.

FIG. 5 is a circuit diagram of a circuit arrangement 550 that includes a circuit 500 configured to be connected to an LED module 501. FIG. 5 is similar to FIG. 4, but unlike circuit 400 of FIG. 4, circuit 500 of FIG. 5 includes an additional pin (e.g., status pin 516) to provide status information of the circuit. Like FIG. 4, FIG. 5 shows an example circuit (e.g., circuit 500) that may be used to control voltage from a voltage source to a sting of LEDs within an LED module 501.

Similar to LED module 401 of FIG. 4, LED module 501 of FIG. 5 may comprise a plurality of LEDs that form a string of LEDs 532 arranged in series. In addition, LED module 501 may comprise a limiting resistor 530 positioned between its input and the string of LEDs 532. Circuit 500 may be configured to control voltage from a voltage source to the string of LEDs 532 in LED module 501 while providing short circuit protection against a single LED short associated with a single LED within the string of LEDs 532.

As shown in FIG. 5, circuit 500 includes a first electrical pin 506 (also referred to as an "input pin") configured to be electrically connected to the voltage source, and a second electrical pin 508 (also referred to as an "output pin") configured to be electrically connected to a string of LEDs 532 within LED module 501. In this configuration, second electrical pin 508 may comprise a first output pin and a second output pin 509 may also be used to electrically couple LED module 501 to circuit 500 with the two output pins 508 and 509 being connected on opposite sides of limiting resistor 530. As with other examples described herein, the voltage source may comprise a DC to DC power converter or another voltage source commonly used to drive LEDs. The term "Vbatt" generally represents the input voltage on the node associated with first electrical pin 506. The term "Vload" generally represents the output voltage on the node associated with second electrical pin 508, which can be electrically coupled to the string of LEDs 532 within LED module 501. A limiting resistor 530 may be positioned on LED module 501 between the LED's and second electrical pin 508 of circuit 500.

Circuit 500 includes a first transistor 502 electrically coupled to the first electrical pin 506 and the second electrical pin 508. First transistor 502 is also labeled T1 in FIG. 5, which is consistent with other examples described herein. First transistor 502 may comprise a power switch configured to define a load current path from the voltage source coupled to first electrical pin 506 to the string of LEDs 532 within LED module 501 coupled to output pin 508. In some examples, first transistor 502 may comprise a PMOS transistor, which may be a cost-effective power switch design for the load current path. However, in other examples, other types of transistors could also be used for first transistor 502.

Circuit 500 also includes a first resistor 504 electrically coupled to the first electrical pin 506 and the second electrical pin 508 and positioned in parallel with first transistor 502. In other words, first resistor 504 and the load current path through first transistor 502 are parallel electrical paths. First resistor 504 defines a high impedance path from first electrical pin 506 to second electrical pin 508 that is much higher than the load current path through first transistor 502 when first transistor 502 is on. In some examples, first resistor 504 defines a resistance between 50 KOhms and 100 Kohms, although another sized resistor could be used in other examples.

As shown in FIG. 5, a second transistor 514 is electrically coupled to a control node (e.g., the gate) of first transistor 502 and to a reference node (e.g., a ground node). Second transistor 514 is also labeled T2 in FIG. 5. In some examples, the second transistor 514 may comprise a NMOS transistor, which may be a cost-effective design for circuit 500. However, in other examples, other types of transistors could also be used for second transistor 514.

In circuit 500, a second resistor 512 is positioned between the first electrical pin and the control node of first transistor 502. Second resistor 512 may define a resistance between 10 KOhms and 47 Kohms, although another sized resistor could be used in other examples. A Zener diode 522 is positioned between the control node (e.g., the gate) of second transistor 514 and the second output pin 509 such that a forward conduction path of the Zener diode 522 is defined from the control node of second transistor 514 to the string of LEDs 531 in LED module 501. In addition, a third resistor 524 is positioned between the control node of second transistor 514 and a reference node (e.g., a ground node). Third resistor 524 may define a resistance between 1 KOhms and 10 Kohms, although another sized resistor could be used in other examples.

Second transistor 514 is configured to turn off in response to a short circuit event associated with a single light emitting diode within the string of light emitting diodes 532. The short circuit event may cause the voltage at node 531 to rise, causing current flow in the reverse direction through Zener diode 522 and changing the control signal at the control node of second transistor 514. In this way, second transistor 514 is controlled based on whether or not a short circuit exists on an LED within the string of LEDs 532. Second transistor 514 remains ON if there is no short circuit in any of the LEDs within LED module 501, which is connected to circuit 500 via second electrical pin 508 (i.e., a first output pin) and second output pin 509. If a short circuit event occurs in the one of the LEDs within LED string 532, second transistor 514 turns OFF as a result of a voltage rise at node 531.

According to this disclosure, first transistor 502 is configured to turn off in response to the second transistor 514 turning off. In this way, the load current path through first transistor 502 can be disabled in response to a single short circuit event associated with a single LED within LED string 532. The short circuit event on one of the LEDs causes second transistor 514 to turn off, which in turn, causes first transistor 502 to turn off. In this way, circuit 500 includes short circuit protection against a short circuit event within a single LED of a plurality of LEDs that form LED string 532, which may be desirable for LED control. When first transistor 502 turns off, the low impedance path from input pin 506 to output pin 508 is disabled and the only current path from input pin 506 to output pin 508 is a high impedance path through first resistor 504. This can protect circuit 500 and other elements of a larger system from damage or electrical failure in the event of a short circuit in the one or more LEDs.

With the example circuit 500 shown in FIG. 5, at start up, if no short-to-ground is present in LED string 532, first resistor 504 biases the output with limited current. If no short is present, the forward voltage of LED string 532 is high enough to overcome Zener diode 522 and trigger second transistor 514 to an ON state, which biases first transistor 502 and creates a low ohmic state for the load current path through first transistor 502. If one LED within LED string 532 is shorted, the voltage on the cathode of Zener diode 522 is not enough to sustain a voltage on the gate of second transistor 514, which causes second transistor 514 to an OFF state, thereby forcing first transistor 502 to an OFF state. Similar to other examples above, some current leakage may occur, but the current leakage is generally limited to $R_1/V_{batt}$, which may be an acceptable amount of current leakage for LED lighting situations such as in motorized or electric vehicle settings.

As with other examples described herein, in some cases, first transistor 502 may comprise a PMOS transistor and second transistor 514 may comprise an NMOS transistor, which is a cost-effective implementation. More generally, however, first transistor 502 and second transistor 514 could each be implemented using other types of transistors, such as those mentioned above.

Unlike the example of circuit 400 in FIG. 4, circuit 500 shown in FIG. 5 further includes a status pin 516 electrically coupled to the control node (e.g., the gate) of first transistor 502. The status pin 516 is configured to define a status signal of the circuit for use a control unit. The control unit, for example, may comprise a microprocessor that delivers control signals to a DC to DC converter that defines the voltage source connected to input pin 506. A status signal on status pin 516 may be the same signal that controls first transistor 502. Thus, the signal that causes first transistor 502 turn off can also be used as a status signal on status pin 516 to report the short circuit event to an external control unit connected to status pin 516. The example shown in FIG. 4 may be more desirable than that of FIG. 5 in some low-cost short circuit protection solutions where the number of pins in the circuit is a cost concern, whereas the example shown in FIG. 5 may be more desirable over that of FIG. 4 when it is desirable to report any short circuit events to the external control unit.

FIG. 6 is a diagram illustrating a circuit arrangement similar to that of FIG. 5 and including another additional circuit pin and some additional electrical elements to facilitate additional control of the circuit. Like FIGS. 4 and 5, FIG. 6 shows an example circuit (e.g., circuit 600) that may be used to control voltage from a voltage source to a sting of LEDs within an LED module 601.

LED module 601 of FIG. 6 may comprise a plurality of LEDs that form a string of LEDs 632 arranged in series. In addition, LED module 601 may comprise a limiting resistor 630 positioned between its input and the string of LEDs 632. Circuit 600 may be configured to control voltage from a voltage source to the string of LEDs 632 in LED module 601 while providing short circuit protection against a single LED short associated with a single LED within the string of LEDs 632.

As shown in FIG. 6, circuit 600 includes a first electrical pin 606 (also referred to as an "input pin") configured to be electrically connected to the voltage source, and a second electrical pin 608 (also referred to as an "output pin") configured to be electrically connected to a string of LEDs 632 within LED module 601. In this configuration, second electrical pin 608 may comprise a first output pin and a second output pin 609 may also be used to electrically couple LED module 601 to circuit 600 with the two output pins 608 and 609 being connected on opposite sides of limiting resistor 630. As with other examples described herein, the voltage source may comprise a DC to DC power converter or another voltage source commonly used to drive LEDs. Again, the term "Vbatt" generally represents the input voltage on the node associated with first electrical pin 606, and the term "Vload" generally represents the output voltage on the node associated with second electrical pin 608, which can be electrically coupled to the string of LEDs 632 within LED module 601. A limiting resistor 630 may be positioned on LED module 601 between the LED's and second electrical pin 608 of circuit 600.

Circuit 600 includes a first transistor 602 electrically coupled to the first electrical pin 606 and the second electrical pin 608. First transistor 602 is also labeled T1 in FIG. 6, which is consistent with other examples described herein. First transistor 602 may comprise a power switch configured to define a load current path from the voltage source coupled to first electrical pin 606 to the string of LEDs 632 within LED module 601 coupled to output pin 608. In some examples, first transistor 602 may comprise a PMOS transistor, which may be a cost-effective power switch design for the load current path. However, in other examples, other types of transistors could also be used for first transistor 602.

Circuit 600 also includes a first resistor 604 electrically coupled to the first electrical pin 606 and the second electrical pin 608 and positioned in parallel with first transistor 602. In other words, first resistor 604 and the load current path through first transistor 602 are parallel electrical paths. First resistor 604 defines a high impedance path from first electrical pin 606 to second electrical pin 608 that is much higher than the load current path through first transistor 602 when first transistor 602 is on. In some examples, first resistor 604 defines a resistance between 50 KOhms and 100 Kohms, although another sized resistor could be used in other examples.

As shown in FIG. 6, a second transistor 614 is electrically coupled to a control node (e.g., the gate) of first transistor 602 via a third transistor 628. Second transistor 612 is also connected to a reference node (e.g., a ground node). Second transistor 614 is also labeled T2 in FIG. 6, and third transistor is labeled T3. In some examples, the second transistor 614 and third transistor 628 may each comprise an NMOS transistor, which may be a cost-effective design for circuit 600. However, in other examples, other types of transistors could also be used for second transistor 614 and third transistor 628.

In circuit 600, a second resistor 612 is positioned between the first electrical pin and the control node of the first transistor 602. Second resistor 612 may define a resistance between 10 KOhms and 47 Kohms, although another sized resistor could be used in other examples. A Zener diode 622 is positioned between the control node (e.g., the gate) of second transistor 614 and output pin 609 such that a forward conduction path of the Zener diode 622 is defined from the control node of second transistor 614 to the string of LEDs 631 in LED module 601. In addition, a third resistor 624 is positioned between the control node of second transistor 614 and a reference node (e.g., a ground node). Third resistor 624 may define a resistance between 1 KOhms and 10 Kohms, although another sized resistor could be used in other examples.

Second transistor 614 is configured to turn off in response to a short circuit event associated with a single light emitting diode within the string of light emitting diodes 632. The short circuit event may cause the voltage at node 631 to rise causing current flow in the reverse direction through Zener diode 622 and changing the control signal at the control node of second transistor 614. In this way, second transistor 614 is controlled based on whether or not a short circuit exists on an LED within the string of LEDs 632. Second transistor 614 remains on if there is no short circuit in any of the LEDs within LED module 601, which is connected to circuit 600 via second electrical pin 608 (i.e., a first output pin) and second output pin 609. If a short circuit event occurs in the one of the LEDs within LED string 632, second transistor 614 turns off as a result of a voltage rise at node 631.

According to this disclosure, first transistor 602 is configured to turn off in response to the second transistor 614 turning off. In this way, the load current path through first transistor 602 can be disabled in response to a single short circuit event associated with a single LED within LED string 632. The short circuit event on one of the LEDs causes second transistor 614 to turn off, which in turn, causes first transistor 602 to turn off. In this way, circuit 600 includes short circuit protection against a short circuit event within a single LED of a plurality of LEDs that form LED string 632, which may be desirable for LED control. When first transistor 602 turns off, the low impedance path from input pin 606 to output pin 608 is disabled and the only current path from input pin 606 to output pin 608 is a high impedance path through first resistor 604. This can protect circuit 600 and other elements of a larger system from damage or electrical failure in the event of a short circuit in the one or more LEDs.

Unlike the example of circuit 400 in FIG. 4 and similar to the example circuit 500 of FIG. 5, circuit 600 shown in FIG. 6 further includes a status pin 616 electrically coupled to the control node (e.g., the gate) of first transistor 602. The status pin 616 is configured to define a status signal of the circuit for use a control unit. The control unit, for example, may comprise a microprocessor that delivers control signals to a DC to DC converter that defines the voltage source connected to input pin 606. A status signal on status pin 616 may be the same signal that controls first transistor 602. Thus, the signal that causes first transistor 602 turn off can also be used as a status signal on status pin 616 to report the short circuit event to an external control unit connected to status pin 616.

As mentioned above (and unlike circuits 400 and 500 of FIGS. 4 and 5), circuit 600 further includes a third transistor 628 positioned between the second transistor and the control node of the first transistor. In addition, circuit 600 includes a control pin 628 configured to provide control signals from a control circuit to a control node of third transistor 628. A fourth resistor 620 is positioned between control pin 618 and the control node of third transistor 628. In this arrangement, third transistor 628 may be configured to turn off in response to the control signals from the control circuit. In this case, first transistor 628 is further configured to turn off in response to third transistor 628 turning off. Accordingly, second transistor 614 and third transistor 628 may be configured to form an AND gate for controlling first transistor 602 such that first transistor 602 defines an "ON" state in response to both the second transistor 614 and third transistor 628 defining "ON" states.

As noted, element 606 may comprise a first electrical pin and element 608 may comprise a second electrical pin. Status pin 616 may comprise a third electrical pin, e.g., coupled to the control node of first transistor 602 and configured to define a status signal of circuit 600 for use by a control unit. Again, third transistor 628 is positioned between second transistor 614 and the control node of first transistor 602. Control pin 618 may comprise a fourth electrical pin configured to provide control signals from a control circuit to a control node of third transistor 628, and a fourth resistor 620 may be positioned between the fourth electoral pin (e.g., control pin 618) and the control node of third transistor 628. The third transistor 628 is configured to turn off in response to the control signals from the control circuit and first transistor 602 is configured to turn off in response to third transistor 628 turning off. The second transistor 614 and third transistor 628 may be configured to form an AND gate for controlling first transistor 602 such that first transistor 602 defines an "ON" state in response to both the second transistor 614 and third transistor 628 defining "ON" states.

With the example circuit 600 shown in FIG. 6, at start up, if no short-to-ground is present in LED string 632, first resistor 604 biases the output with limited current. If no short is present, the forward voltage of LED string 632 is high enough to overcome Zener diode 622 and trigger second transistor 614 to an ON state. If a control signal is applied to control terminal 618 from an external control unit to turn third transistor 628 to an ON state, second transistor 614 and third transistor 628 are allowed to bias first transistor 602 to cause first transistor 602 to be ON and thereby create a low ohmic path for the load current path through circuit 600. However, if one LED exhibits an electrical short, the voltage on the cathode of Zener diode 622 may be insufficient to overcome Zener diode 622 to sustain a voltage on the gate of second transistor 614. When the voltage at the gate of second transistor 614 goes to approximately 0 V, as a result of an electrical short in one LED within LED string 632, this forces first transistor 602 to an OFF state, thereby protecting the circuit against the electrical short. Some current leakage may occur, but the current leakage is generally limited to $R_1/V_{batt}$, which may be an acceptable amount of current leakage for LED lighting situations such as in motorized or electric vehicle settings.

Figure 7:
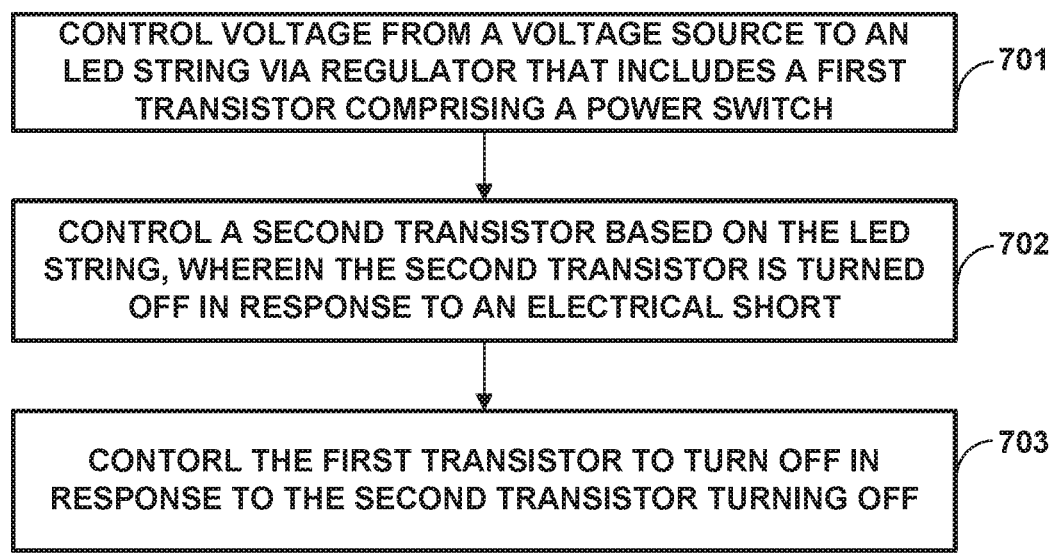
FIG. 7 is a flow diagram consistent with techniques performed by a circuit of this disclosure.

FIG. 7 is a flow diagram consistent with techniques performed by a circuit (such as circuit 100, 200, 300, 400, 500, or 600) consistent with this disclosure. As shown in FIG. 7, the method comprises controlling voltage from a voltage source to one or more light emitting diodes via a circuit (e.g., circuit 100, 200, 300, 400, 500, or 600) that includes a first transistor (T1) comprising a power switch configured to define a load current path from the voltage source to the one or more light emitting diodes (701). The circuit also controls a control node of a second transistor (T2) based on the light emitting diodes, wherein the second transistor (T2) is configured to turn off when one or more of the light emitting diodes exhibit an electoral short (702). In addition, the circuit controls a control node of the first transistor (T1) such that the first transistor is configured to turn off in response to the second transistor turning off.

In some examples (such as with circuits 200, 300, 500, or 600), the method shown in FIG. 7 may further include providing a status indication of the circuit based on the control node of the first transistor (T1). In some example (such as with circuits 300 or 600), the method shown in FIG. 7 may further include receiving control signals from a control circuit to the control node of the second transistor (T2), wherein second transistor (T2) is further configured to turn off in response to the control signals from the control circuit or in response to the one or more light emitting diodes exhibiting the electrical short.

In some examples (such as with circuit 600), the circuit may include a third transistor (T3) positioned between the second transistor (T2) and the control node of the first transistor (T1), and the method may further comprise receiving a control signal at the third transistor (T3) wherein the third transistor (T3) is further configured to turn on or off in response to the control signal from the control circuit and wherein the first transistor (T1) is configured to turn off in response to the third transistor (T3) turning off. In this case (consistent with circuit configuration of FIG. 6), the second transistor (T2) and third transistor (T3) may form an AND gate for controlling first transistor (T1) such that the first transistor (T1) defines an "ON" state in response to both the second and third transistors (T2 and T3) defining "ON" states.

In still other examples (such as with any of circuits 400, 500, or 600), the one or more light emitting diodes may comprise a string of light emitting diodes and wherein the electoral short comprises a single short associated with one light emitting diode within the string of light emitting diodes. The presence of Zener diode (e.g., 422, 522, or 622) may facilitate the ability to detect a single LED short within a string of LEDs.

The following examples may illustrate one or more aspects of the disclosure.

Example 1—A circuit configured to control voltage from a voltage source to one or more light emitting diodes, the circuit comprising: a first electrical pin configured to be electrically connected to the voltage source; a second electrical pin configured to be electrically connected to the one or more light emitting diodes; a first transistor electrically coupled to the first electrical pin and the second electrical pin, wherein the first transistor comprises a power switch configured to define a load current path from the voltage source to the one or more light emitting diodes; a first resistor electrically coupled to the first electrical pin and the second electrical pin and positioned in parallel with the load current path; a second transistor electrically coupled to a control node of the first transistor and a reference node, wherein a control node of the second transistor is electrically coupled to the second electrical pin; and a second resistor positioned between the first electrical pin and the control node of the first transistor, wherein the second transistor is configured to turn off in response to a short circuit event in the one or more light emitting didoes, and wherein the first transistor is configured to turn off in response to the second transistor turning off.

Example 2—The circuit of example 1, further comprising: a status pin electrically coupled to the control node of the first transistor, wherein the status pin is configured to define a status signal of the circuit for use a control unit.

Example 3—The circuit of example 1 or 2, further comprising: a diode positioned between the control node of the second transistor and the second electrical pin such that a forward conduction path of the diode is defined from the control node of the second transistor to the second electrical pin; a control pin configured to provide control signals from a control circuit to the control node of the second transistor; and a third resistor positioned between the control pin and the control node of the second transistor, wherein second transistor is further configured to turn off in response to the control signals from the control circuit.

Example 4—The circuit of example 1, further comprising: a third electrical pin electrically coupled to the control node of the first transistor, wherein the third electrical pin is configured to define a status signal of the circuit for use by a control unit; a diode positioned between the control node of the second transistor and the second electrical pin such that a forward conduction path of the diode is defined from the control node of the second transistor to the second electrical pin; a fourth electrical pin configured to provide control signals from the control circuit to the control node of the second transistor; and a third resistor positioned between the fourth electrical pin and the control node of the second transistor, wherein second transistor is further configured to turn off in response to the control signals from the control circuit.

Example 5—The circuit of any of examples 1-4, wherein: the first transistor comprises a p-type metal oxide semiconductor (PMOS) transistor; and the second transistor comprises an n-type metal oxide semiconductor (NMOS) transistor.

Example 6—A circuit configured to control voltage from a voltage source to a string of light emitting diodes, the circuit comprising: a first electrical pin configured to be electrically connected to the voltage source; a second electrical pin configured to be electrically connected to the string of light emitting diodes; a first transistor electrically coupled to the first electrical pin and the second electrical pin, wherein the first transistor comprises a power switch configured to define a load current path from the voltage source to the string of light emitting diodes; a first resistor electrically coupled to the first electrical pin and the second electrical pin and positioned in parallel with the load current path; a second transistor electrically coupled to a control node of the first transistor and a reference node, wherein a control node of the second transistor is electrically coupled to the second electrical pin; a second resistor positioned between the first electrical pin and the control node of the first transistor, a Zener diode positioned between the control node of the second transistor and the second electrical pin such that a forward conduction path of the diode is defined from the control node of the second transistor to the string of light emitting diodes; and a third resistor positioned between the control node of the second transistor and the reference node, wherein the second transistor is configured to turn off in response to a short circuit event associated with a single light emitting diode within the string of light emitting diodes, and wherein the first transistor is configured to turn off in response to the second transistor turning off.

Example 7—The circuit of example 6, further comprising: a status pin electrically coupled to the control node of the first transistor, wherein the status pin is configured to define a status signal of the circuit for use by a control unit.

Example 8—The circuit of example 6 or 7, further comprising: a third transistor positioned between the second transistor and the control node of the first transistor; a control pin configured to provide control signals from a control circuit to a control node of the third transistor; and a fourth resistor positioned between the control pin and the control node of the third transistor, wherein third transistor is further configured to turn off in response to the control signals from the control circuit and wherein the first transistor is configured to turn off in response to the third transistor turning off.

Example 9—The circuit of example 8, wherein the second and third transistors form an AND gate for controlling the first transistor such that the first transistor defines an "ON" state in response to both the second and third transistors defining "ON" states.

Example 10—The circuit of example 8, further comprising: a third electrical pin electrically coupled to the control node of the first transistor, wherein the third electrical pin is configured to define a status signal of the circuit for use by a control unit; a third transistor positioned between the second transistor and the control node of the first transistor; a fourth electrical pin configured to provide control signals from a control circuit to a control node of the third transistor; and a fourth resistor positioned between the fourth electoral pin and the control node of the third transistor, wherein the third transistor is further configured to turn off in response to the control signals from the control circuit and wherein the first transistor is configured to turn off in response to the third transistor turning off.

Example 11—The circuit of example 10, wherein the second and third transistors form an AND gate for controlling the first transistor such that the first transistor defines an "ON" state in response to both the second and third transistors defining "ON" states.

Example 12—The circuit of any of examples 6-10, wherein: the first transistor comprises a p-type metal oxide semiconductor (PMOS) transistor; and the second transistor comprises an n-type metal oxide semiconductor (NMOS) transistor.

Example 13—A method comprising: controlling voltage from a voltage source to one or more light emitting diodes via a circuit that includes a first transistor comprising a power switch configured to define a load current path from the voltage source to the one or more light emitting diodes; controlling a control node of a second transistor based on the light emitting diodes, wherein the second transistor is configured to turn off when one or more of the light emitting diodes exhibit an electoral short; and controlling a control node of the first transistor such that the first transistor is configured to turn off in response to the second transistor turning off.

Example 14—The method of example 13, further comprising: providing a status indication of the circuit based on the control node of the first transistor.

Example 15—The method of example 13 or 14, further comprising: receiving control signals from a control circuit to the control node of the second transistor, wherein second transistor is further configured to turn off in response to the control signals from the control circuit or in response to the one or more light emitting diodes exhibiting the electrical short.

Example 16—The method of example 13 or 14, further comprising: receiving a control signal at a third transistor positioned between the second transistor and the control node of the first transistor, wherein the third transistor is further configured to turn on or off in response to the control signal from the control circuit and wherein the first transistor is configured to turn off in response to the third transistor turning off.

Example 17—The method of example 16, wherein the second and third transistors form an AND gate for controlling the first transistor such that the first transistor defines an "ON" state in response to both the second and third transistors defining "ON" states.

Example 18—The method of any of examples 13-17, wherein the one or more light emitting diodes comprises a string of light emitting diodes and wherein the electoral short comprises a single short associated with one light emitting diode within the string of light emitting diodes.

Various aspects have been described in this disclosure. These and other aspects are within the scope of the following claims.

The invention claimed is:

1. A circuit configured to control voltage from a voltage source to one or more light emitting diodes, the circuit comprising:
a first electrical pin configured to be electrically connected to the voltage source;
a second electrical pin configured to be electrically connected to the one or more light emitting diodes;
a first transistor electrically coupled to the first electrical pin and the second electrical pin, wherein the first transistor comprises a power switch configured to define a load current path from the voltage source to the one or more light emitting diodes;
a first resistor electrically coupled to the first electrical pin and the second electrical pin and positioned in parallel with the load current path;
a second transistor electrically coupled to a control node of the first transistor and a reference node, wherein a control node of the second transistor is electrically coupled to the second electrical pin; and
a second resistor positioned between the first electrical pin and the control node of the first transistor,
wherein the second transistor is configured to turn off in response to a short circuit event in the one or more light emitting diodes, and
wherein the first transistor is configured to turn off in response to the second transistor turning off.

2. The circuit of claim 1, further comprising:
a status pin electrically coupled to the control node of the first transistor, wherein the status pin is configured to define a status signal of the circuit for use by a control unit.

3. The circuit of claim 1, further comprising:
a diode positioned between the control node of the second transistor and the second electrical pin such that a forward conduction path of the diode is defined from the control node of the second transistor to the second electrical pin;
a control pin configured to provide control signals from a control circuit to the control node of the second transistor; and
a third resistor positioned between the control pin and the control node of the second transistor,
wherein second transistor is further configured to turn off in response to the control signals from the control circuit.

4. The circuit of claim 1, further comprising:
a third electrical pin electrically coupled to the control node of the first transistor, wherein the third electrical pin is configured to define a status signal of the circuit for use by a control unit;
a diode positioned between the control node of the second transistor and the second electrical pin such that a forward conduction path of the diode is defined from the control node of the second transistor to the second electrical pin;
a fourth electrical pin configured to provide control signals from a control circuit to the control node of the second transistor; and
a third resistor positioned between the fourth electrical pin and the control node of the second transistor,
wherein second transistor is further configured to turn off in response to the control signals from the control circuit.

5. The circuit of claim 1, wherein:
the first transistor comprises a p-type metal oxide semiconductor (PMOS) transistor; and
the second transistor comprises an n-type metal oxide semiconductor (NMOS) transistor.

6. A circuit configured to control voltage from a voltage source to a string of light emitting diodes, the circuit comprising:
a first electrical pin configured to be electrically connected to the voltage source;
a second electrical pin configured to be electrically connected to the string of light emitting diodes;
a first transistor electrically coupled to the first electrical pin and the second electrical pin, wherein the first transistor comprises a power switch configured to define a load current path from the voltage source to the string of light emitting diodes;
a first resistor electrically coupled to the first electrical pin and the second electrical pin and positioned in parallel with the load current path;
a second transistor electrically coupled to a control node of the first transistor and a reference node, wherein a control node of the second transistor is electrically coupled to the second electrical pin;
a second resistor positioned between the first electrical pin and the control node of the first transistor,
a Zener diode positioned between the control node of the second transistor and the second electrical pin such that a forward conduction path of the diode is defined from the control node of the second transistor to the string of light emitting diodes; and
a third resistor positioned between the control node of the second transistor and the reference node,
wherein the second transistor is configured to turn off in response to a short circuit event associated with a single light emitting diode within the string of light emitting diodes, and
wherein the first transistor is configured to turn off in response to the second transistor turning off.

7. The circuit of claim 6, further comprising:
a status pin electrically coupled to the control node of the first transistor, wherein the status pin is configured to define a status signal of the circuit for use by a control unit.

8. The circuit of claim 6, further comprising:
a third transistor positioned between the second transistor and the control node of the first transistor;

a control pin configured to provide control signals from a control circuit to a control node of the third transistor; and a fourth resistor positioned between the control pin and the control node of the third transistor, wherein third transistor is further configured to turn off in response to the control signals from the control circuit and wherein the first transistor is configured to turn off in response to the third transistor turning off.

9. The circuit of claim 8, wherein the second and third transistors form an AND gate for controlling the first transistor such that the first transistor defines an "ON" state in response to both the second and third transistors defining "ON" states.

10. The circuit of claim 6, further comprising:
a third electrical pin electrically coupled to the control node of the first transistor, wherein the third electrical pin is configured to define a status signal of the circuit for use by a control unit;

a third transistor positioned between the second transistor and the control node of the first transistor;

a fourth electrical pin configured to provide control signals from a control circuit to a control node of the third transistor; and a fourth resistor positioned between the fourth electoral pin and the control node of the third transistor, wherein the third transistor is further configured to turn off in response to the control signals from the control circuit and wherein the first transistor is configured to turn off in response to the third transistor turning off.

11. The circuit of claim 10, wherein the second and third transistors form an AND gate for controlling the first transistor such that the first transistor defines an "ON" state in response to both the second and third transistors defining "ON" states.

12. The circuit of claim 6, wherein:
the first transistor comprises a p-type metal oxide semiconductor (PMOS) transistor; and
the second transistor comprises an n-type metal oxide semiconductor (NMOS) transistor.

13. A method comprising:
controlling voltage from a voltage source to one or more light emitting diodes via a circuit that includes a first transistor comprising a power switch configured to define a load current path from the voltage source to the one or more light emitting diodes;

controlling a control node of a second transistor based on the light emitting diodes, wherein the second transistor is configured to turn off when one or more of the light emitting diodes exhibit an electrical short;

controlling a control node of the first transistor such that the first transistor is configured to turn off in response to the second transistor turning off; and receiving a control signal at a third transistor positioned between the second transistor and the control node of the first transistor, wherein the third transistor is further configured to turn on or off in response to the control signal from a control circuit and wherein the first transistor is configured to turn off in response to the third transistor turning off.

14. The method of claim 13, further comprising:
providing a status indication of the circuit based on the control node of the first transistor.

15. The method of claim 13, further comprising:
receiving control signals from a control circuit to the control node of the second transistor,
wherein the second transistor is further configured to turn off in response to the control signals from the control circuit or in response to the one or more light emitting diodes exhibiting the electrical short.

16. The method of claim 13, wherein the second and third transistors form an AND gate for controlling the first transistor such that the first transistor defines an "ON" state in response to both the second and third transistors defining "ON" states.

17. A method comprising:
controlling voltage from a voltage source to one or more light emitting diodes via a circuit that includes a first transistor comprising a power switch configured to define a load current path from the voltage source to the one or more light emitting diodes;

controlling a control node of a second transistor based on the light emitting diodes, wherein the second transistor is configured to turn off when one or more of the light emitting diodes exhibit an electrical short; and controlling a control node of the first transistor such that the first transistor is configured to turn off in response to the second transistor turning off, wherein the one or more light emitting diodes comprises a string of light emitting diodes and wherein the electoral short comprises a single short associated with one light emitting diode within the string of light emitting diodes.

\* \* \* \* \*